United States Patent Office 3,804,883
Patented Apr. 16, 1974

3,804,883
1-[2',4' - DISUBSTITUTED - 6' - ω - SUBSTITUTED-
HEXYL-1'-PHENYL]-1-OLEFIN-3-ONES
Eugene E. Galantay, Morristown, N.J., assignor to
Sandoz-Wander, Inc., Hanover, N.J.
No Drawing. Continuation-in-part of abandoned application Ser. No. 86,270, Nov. 2, 1970. This application
Nov. 22, 1971, Ser. No. 201,109
Int. Cl. C07c 69/76
U.S. Cl. 260—473 R                     9 Claims

ABSTRACT OF THE DISCLOSURE

The invention discloses compounds of the formula:

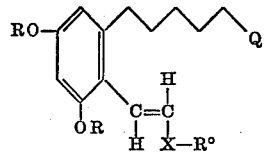

in which X is —CHOH— or —CO—; Q is —CH$_2$OH,
—COOR' or, in certain instances, —CHO or

—CH$_2$OOCR"

R° is straight chain lower alkyl (C$_4$–C$_6$); and R is hydrogen, alkyl, cycloalkyl or —OCR"; R' is hydrogen (or a substitute salt forming cation) or R"; and R" is alkyl, as defined or qualified in the following specification, e.g. 1-[2',4'-dimethoxy-6'-ω-hydroxyethyl-1'-phenyl] - 1 - octen-3-one, said compounds being useful as pharmaceutical agents, e.g. as agents for control of reproduction in females. The above final products may be prepared by reacting a 6-ω-substituted-hexyl-2,4-disubstituted - benzaldehyde with a dialkyl-2-oxoalkyl phosphorane in the presence of a base or from certain of the final products by oxidation, esterification or reduction depending on the final product desired. The 6-ω-substituted-hexyl - 2,4-disubstituted-benzaldehydes are obtained by benzylic oxidation of a 4-hydroxymethyl-5-ω-hydroxyhexyl-1,3-disubstituted-benzene which in turn are obtained by reduction of a 6-ω-carboxypentyl-2,4-disubstituted-benzoic acid.

This application is a continuation-in-part of copending application Ser. No. 86,270, filed Nov. 2, 1970, now abandoned.

The present invention relates to chemical compounds, and more particularly to compounds which are 1-[2',4'-disubstituted-6'-ω-substituted-hexyl-1'-phenyl] - 1 - olefin-3-ones or -3-ols in which the olefin is of 4 to 6 carbon atoms. The invention also relates to pharmaceutical compositions and pharmaceutical methods utilizing the pharmacological properties of said compounds.

The compounds of the present invention may be represented by the following Formula I:

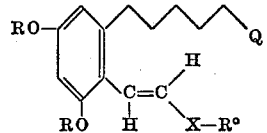

wherein
X is

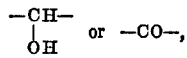 or —CO—,

R° is straight chain alkyl of 4 to 6 carbon atoms, i.e. butyl, pentyl or hexyl,
Q is —CH$_2$OH, —COOR', —CH$_2$OOCR" or —CHO,
provided that X is —CO— when Q is —CHO,
R' is hydrogen (or a cation forming a pharmaceutically acceptable salt) or R", R" is lower alkyl of 1 to 4 carbon atoms, and both R which are the same, are hydrogen, lower alkyl of 1 to 3 carbon atoms, cyclo(lower)alkyl of 3 to 6 carbon atoms or —OCR", provided that Q is —CH$_2$OOCR" when R is —OCR" (with all R" being the same), and further provided that Q is other than —CH$_2$OOCR" when R is hydrogen.

Certain of the compounds of the Formula I having the Formula Ia:

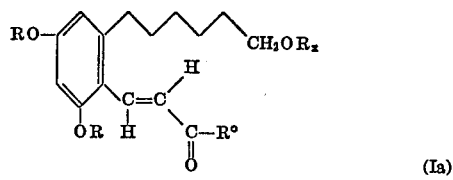

(Ia)

in which R is as defined above and R$_x$ is hydrogen or —OCR" in which R" is as defined are preferably prepared in a Step A reaction involving the reaction of a compound of the Formula II

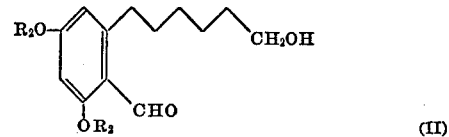

(II)

in which R$_2$ is hydrogen, lower alkyl of 1 to 3 carbon atoms or cyclo(lower) alkyl of 3 to 6 carbon atoms, with a compound of the Formula III:

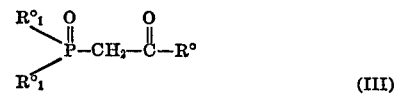

(III)

in which R° is as defined and R°$_1$ is lower alkyl of 1 to 3 carbon atoms, while protecting the 6'-ω-hydroxyhexyl moiety in a known manner, and followed by removal of the protection to obtain a compound of the Formula Ia.

The compounds of the invention of the Formula Ib:

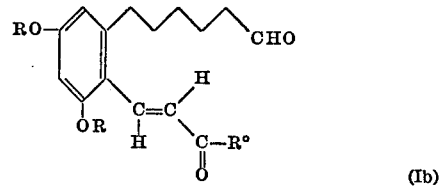

(Ib)

in which R° and R are as defined, are preferably prepared in a Step B reaction involving the subjecting of a compound of the Formula Ia to controlled terminal oxidation in a known manner.

The compounds of the invention having the Formula Ic:

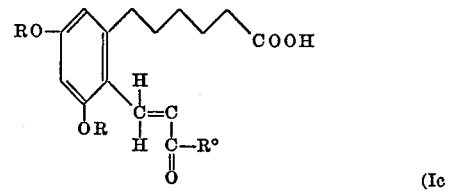

(Ic)

in which R° and R are as defined, are preferably prepared in a Step C–1 or C–2 reaction involving the subjecting of a compound of the Formula Ia or Ib, respectively, to complete terminal oxidation in a known manner.

The compounds of the invention of the Formula Id:

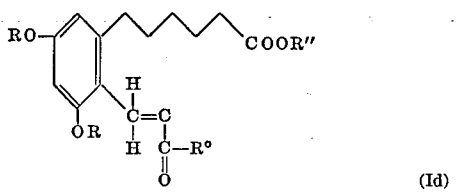

in which R°, R and R" are as above defined, are preferably prepared in a Step D reaction involving the subjecting of a compound of the Formula Ic to esterification in a known manner.

The compounds of the invention of the Formula Ie:

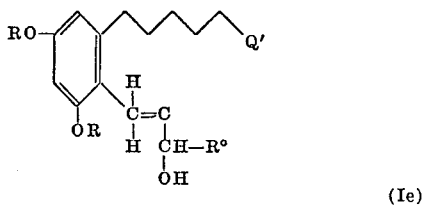

in which R° and R are as defined, Q' is the same as Q but excluding —CHO therefrom, are preferably prepared in a Step E reaction involving the reduction of a compound of the Formula I in which X is —CO— in a known manner.

The Step A reaction involving the reaction of a Compound II with a Compound III is preferably effected in three parts involving the protection of the hydroxyl group or groups on the compound of the Formula II followed by the reaction of the protected Compound II with the Compound III and finally the removal of the protecting group(s) to obtain the desired compound of the Formula Ia. The preparation of the protected Compound II may be effected in a known manner, preferably by reacting the compound with a suitable reagent to provide a protective group for a hydroxyl group, e.g. trimethyl chlorosilane. The reaction is suitably effected at temperatures in the range of from minus 15° C. to plus 25° C., more suitably from minus 5° C. to plus 10° C., in the presence of a base and inert organic solvent. The base is conveniently pyridine which also serves as solvent for the reaction. The protected Compound II is preferably isolated as an oil for use in the next olefin-formation step in which the protected Compound II is reacted with the Compound III. The reaction of the protected Compound II with the Compound III is suitably carried out in a known manner with the aid of a strong base, e.g., sodium hydride which is preferably first reacted with the Compound III followed by combining the resulting reaction product with the protected Compound II. The olefin-formation is conveniently effected at elevated temperatures in the range of from 30° C. to 100° C., preferably 40° C. to 80° C., and in the presence of an inert organic solvent of known type, preferably an ether such as dimethoxyethane. The protected reaction product of the Formula Ia is then subjected to reaction in a known manner to remove the protecting group(s) and form the compound of the Formula Ia. Such "deprotection" reaction may be conveniently effected without isolation of the protected reaction product and is suitably carried out employing a strong acid, e.g. sulfuric acid, at temperatures in the range of from minus 10° C. to plus 50° C., more suitably at from 0° C. to 30° C. It will be evident that the Step A reaction may be varied as desired or required to produce various of the products of the Formula Ia. For example, when R is hydrogen a three fold amount of protecting compound is desirably employed to protect all three hydroxyl groups on the compound of the Formula II. In another variation, when producing the compound of the Formula Ia in which $R_x$ is —OCR", the "deprotection" reaction may be effected with an acylating acid, e.g. acetic anhydride, to obtain the compounds of the Formula Ia in which $R_x$ is —OCR" and, in the situation when R is hydrogen, those in which $R_x$ and both R are —OCR". The acylation "deprotection" reaction may be effected at temperatures of from minus 10° C. to 50° C., conveniently about room temperature (20° C.) and in the presence of a base and organic solvent which are conveniently provided by employing pyridine. In general, the reaction product of the Formula Ia may be isolated and recovered by working up by established procedures.

The reaction of Step B is a controlled oxidation which may be suitably effected in a known manner employing, for example, silver carbonate on Celite as the oxidizing agent and elevated temperatures in the range of from 30° C. to 120° C., preferably 50° C. to 100° C. Alternately, the oxidation may be carried out with a suitable metallic alkoxide, e.g. aluminum triisopropoxide, in accordance with the known Oppenauer oxidation. The oxidation, in general, is effected in the presence of an inert organic solvent of conventional type, preferably an aromatic solvent such as benzene and the like. The reaction product of the Formula I may be isolated and recovered from the reaction mixture of Step B by working up by conventional procedures.

The reaction of Steps C-1 and C-2 is suitably effected in a known manner employing oxidizing agents suitable for converting an aliphatic alcohol or aldehyde to the corresponding acid. In general, the oxidation may be carried out at temperatures in the range of from 10° C. to 100° C. and in the presence of an inert organic solvent of conventional type. The Compounds Ic are preferably prepared by oxidation of a Compound Ia employing chromic acid/sulfuric acid (Jones Reagent) as the agent and a ketone, e.g. acetone, as the solvent. Preferred temperatures for such oxidation are in the range of from 15° C. to 40° C. The preparation of Compound Ic from Compounds Ib is preferably effected employing silver hydroxide as the oxidizing agent and an alcoholic solvent, e.g. ethanol. The reaction product of the Formula Ic may be isolated and recovered from the reaction mixture of Steps C-1 and C-2 by working up by conventional procedures.

The reaction of Step D is a conventional esterification reaction and is suitably effected in a known manner, preferably at temperatures in the range of from minus 20° C. to plus 40° C. in the presence of a strong acid, e.g. sulfuric acid, as catalyst. An excess of the alcohol is conveniently employed. The reaction product of the Formula Id may be recovered from the reaction mixture of Step D by working up by established procedures.

The reaction of Step E is a conventional ketone reduction suitably carried out at temperatures in the range of from 0° C. to 80° C., conveniently at from 10° C. to 35° C. The reduction is effected in a solvent medium, which depending upon the starting compound, is preferably water and/or a lower alcohol. The preferred reducing agents are the alkali metal borohydrides such as sodium borohydride and lithium borohydride. The reaction product of the Formula Ie may be isolated and recovered from the reaction mixture of Step E by working up by established procedures, and when Q' is —COOR' in the starting compound it will be evident that the reaction product may be recovered in the form of an alkali metal salt and such salt converted to the corresponding free acid or ester or other salts, as desired, by conventional procedures.

The compounds of the Formula II employed as starting material in the Step A reaction may be prepared by subjecting a compound of the Formula IV:

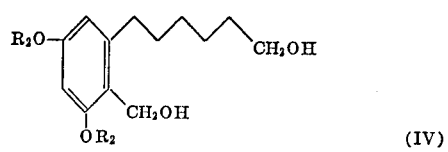

wherein $R_2$ is as above defined to "benzylic oxidation" in a known manner to obtain a compound of the Formula II:

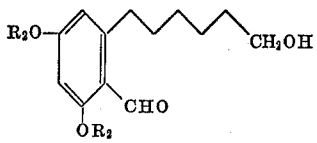

(II)

in which $R_2$ is as above defined. Such preparation of the Compounds II is suitably effected at temperatures in the range of from minus 10° C. to plus 60° C., conveniently at about room temperature. The reaction is carried out in an inert organic solvent of known type, preferably an ether such as dioxane. Suitable oxidizing agents for effecting such selective oxidation are known and include dichlorodicyanoquinone and manganese dioxide, preferably dichlorodicyanoquinone. The reaction product of the Formula II may be isolated and recovered by working up by conventional procedures.

The compounds of the Formula IV may be prepared by subjecting a compound of the Formula V:

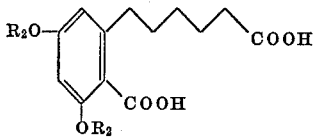

(V in which $R_2$ is as defined, to reduction in a known manner employing diborane or metallic hydrides of the type suitable for reducing a carboxylic acid to the corresponding alcohol, preferably lithium aluminum hydride or diborane. The reduction is suitably carried out at temperatures from 0° C. to 80° C., more suitably 10° C. to 30° C. and in the presence of an inert organic solvent of conventional type, preferably an ether such as tetrahydrofuran. The reaction product of the Formula IV may be isolated from the resulting reaction mixture by working up by conventional procedures.

The compounds of the Formula V employed as starting material in preparation of the Compound IV are either known per se or may be prepared from known materials by available procedures.

The compounds of the Formula I in which R is hydrogen are desirably prepared from the compounds of the Formula II in which $R_2$ is hydrogen as above indicated. The latter may be prepared as above indicated from Compounds IV in which $R_2$ is hydrogen which in turn may be prepared from Compounds V in which $R_2$ is hydrogen which in turn may be prepared from known materials by available procedures. It will be evident, however, that the compounds of the Formula II in which $R_2$ is hydrogen may be prepared from other intermediates of the Formulae II, IV and V in which $R_2$ is other than hydrogen. For example, the compounds of the Formula II in which $R_2$ is hydrogen and having the Formula IIa:

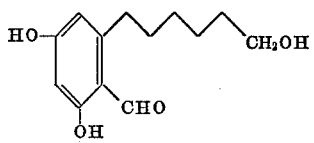

(IIa)

may be also produced by subjecting a compound of the Formula II in which $R_2$ is alkyl to dealkylation in a known manner. Such preparation, which is preferably a demethylation, is preferably effected with a boron trihalide, e.g., boron trichloride or boron tribromide, in an inert organic solvent of conventional type, e.g., methylene chloride. The dealkylation may be suitably effected at temperatures in the range of from minus 80° C. to plus 40° C., more suitably at temperature of from 10° C. to plus 30° C.

Alternately, the intermediates of the Formulae II and V in which $R_2$ is benzyl may be converted to the corresponding compounds in which $R_2$ is hydrogen in a known manner, for example by catalytic hydrogenation. Such catalytic hydrogenation may be carried out over a fairly wide temperature range of from 10° C. to 80° C., preferably 15° C. to 30° C. The hydrogenation catalyst may be of known type, preferably palladium supported on carbon, e.g. a catalyst comprising 3–12% paladium on 88–97% charcoal. The hydrogenation is conducted in the presence of an inert solvent which is suitably water and/or a lower alcohol such as ethanol. An alternative and preferred method of obtaining the compound of the Formula II in which $R_2$ is hydrogen (i.e. Compound IIa) from the Compound II in which $R_2$ is benzyl is by acid catalysis involving subjecting the Compound II in which $R_2$ is benzyl to the action of hydrogen bromide in glacial acetic acid at temperatures in the range of from 10° C. to 100° C., preferably 20–80° C. In this procedure, the ω-hydroxy group may be to some extent esterified but can be readily restored, e.g., by subsequent treatment with silver acetate and potassium hydroxide. The compounds of the Formula V in which $R_2$ is benzyl may also be prepared from known materials by available procedures.

Conversely, the compounds of the Formula II in which R is alkyl may also be produced by subjecting a compound of the Formula IIa to "phenolic alkylation" in a known manner such as by reacting the Compound IIa with a compound of the Formula VIa or VIb:

(VIa)    $R_3$—$OSO_2$ or (VIb)    $R_3I$ in which $R_3$ is alkyl of 1 to 3 carbon atoms, in an alcoholic solvent, e.g. t-butanol or ethanol, and in the presence of a base, e.g. an alkali metal hydroxide. The resulting reaction product may be isolated by conventional procedures.

The compounds of the Formula I in which Q is —COOH form salts and the pharmaceutically acceptable salts thereof are included within the scope of the pharmaceutically useful compounds of the present invention. Such salts forming pharmaceutically acceptable compounds of the Formula I include, by way of illustration, the sodium salt and the triethyl ammonium salt. In general, the salts may be produced from the free acids by established procedures. Conversely, the free acids may be obtained from the salts by well-known procedures.

The compounds of the Formula I (and the pharmaceutically acceptable salts of those in which Q is —COOH) are useful because they possess pharmacological activity in animals. In general, the compounds of Formula I are considered to be structurally related in certain functional aspects to the natural hormone class of "prostaglandins" and pharmaceutical usage for the purposes for which the prostaglandins are useful is indicated. Thus, the compounds of the Formula I (and the pharmaceutically acceptable salts of those in which Q is —COOH) may be used as fertility control agents to control reproduction by means of expulsion of the embryo from the reproductive tract on administration during the early stages of pregnancy as indicated in vitro by effecting an increase in progesterone synthesis in the rat ovary and by effecting a relaxation or stimulation of smooth muscles in vitro in tests on the uterus of the rabbit.

For fertility control usage, the compounds may be combined with a pharmaceutically acceptable carrier or adjuvant and administered by the variety of modes by which the natural prostaglandins are administered for fertility control, e.g. intravenously, subcutaneously, intramuscularly, rectally, intravaginally, buccally, sublingually, and by sustained release implants. The dosage will vary depending upon known factors such as mode of administration and the compound employed. However, in general, satisfactory results are obtained when the compounds are administered at a total daily dosage of from 0.01 to 20 milligrams per kilogram of animal body weight. For most mammals the daily administration during the early stages of pregnancy of from 1 to 200 milligrams provides satisfactory results and dosage forms suitable for internal administration comprise from about 0.25 milligram to about 100 milligrams of the compounds in admixture with a solid or liquid pharmaceutical carrier or diluent.

For the above usage, the pharmaceutical compositions provided by the invention may be formulated in a conventional manner to contain an effective dose of a compound of the Formula I as active ingredient together with an inert pharmaceutically acceptable carrier or diluent adapted to provide a composition suitable for the desired mode of administration. For buccal or sublingual administration, the compositions may take such conventional forms as tablets, capsules, and the like which may be prepared by known methods and which may contain one or more conventional adjuvants, such as sweetening agents, flavoring agents, coloring agents and preserving agents; or conventional pharmaceutical excipients, e.g., inert diluents, granulating and disintegrating agents, lubricating agents, suspending agents and wetting agents. For intravenous or subcutaneous administration there may be utilized the conventional forms such as sterile solutions or suspensions of the active ingredient in aqueous or nonaqueous mediums or isotonic solutions when a pharmaceutically acceptable salt of a compound of the Formula I in which Q is —COOH is utilized. For rectal or vaginal administration suppositories formulated and prepared in a conventional manner may be employed. A sterile capsule of conventional materials such as silicone rubber may be prepared by established procedures and utilized for administration by an implant.

The compounds of the Formula I (and the pharmaceutically acceptable salts of those in which Q is —COOH) are also useful as hypotensive agents, as indicated by a lowering of blood pressure on intravenous administration to the anesthetized dog. For the above use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For hypotensive use, the dosage administered will, of course, vary depending upon the compounds used and the mode of administration. However, in general, satisfactory results are obtained when administered at a daily dosage of from about .6 milligram to about 30 milligrams per kilogram of body weight, preferably given in divided doses 2 to 4 times a day, or in sustained release form. For most mammals the administration of from about 40 milligrams to about 1000 milligrams of the compound per day provides satisfactory results and dosage forms suitable for internal administration comprise from about 10 milligrams to about 500 milligrams of the compound in admixture with a solid or liquid pharmaceutical carrier or diluent.

Additionally, the compounds of the Formula I are also useful as bronchodilator agents as indicated by observing the respiratory status on oral administration to the unanesthetized guinea pig exposed to aerosolized histamine dihydrochloride according to a modification of the method of Van Arman et al., J. Pharmacol. Exptl. Therap. 133: 90–97, 1961; and in vitro by observing the effect on strips of guinea pig trachea according to the method of Constantine, J. Pharm. Pharmacol. 17: 384–385, 1960. For such use and depending upon known variables satisfactory results are obtained in general on the daily administration of from 0.5 to 100 milligrams per kilogram of body weight, preferably given in divided doses 2 to 4 times a day, or in sustained release form. For most mammals the administration of from 30 to 3000 milligrams per day provides satisfactory results and dosage forms suitable for internal administration comprise 8 to 1500 milligrams of the compound in admixture with a solid or liquid pharmaceutical carrier or diluent.

The Compounds I may be combined with a pharmaceutically acceptable carrier, and such other conventional adjuvants as may be necessary, and administered orally or parenterally for use as hypotensives and orally or by inhalation therapy as bronchodilators. Oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl - p - hydroxybenzoate). Capsules may contain the active ingredient alone or admixed with an inert solid diluent, e.g., calcium carbonate, calcium phosphate and kaolin. For intravenous administration there may be utilized the conventional forms such as sterile solutions or suspensions of the active ingredient in aqueous or nonaqueous mediums or isotonic solutions when a pharmaceutically acceptable salt of a compound of the Formula I in which Q is —COOH is utilized.

A representative formulation is a tablet for oral administration 2 to 4 times a day for effecting a lowering of blood pressure or for prophylactic treatment of bronchial asthma and prepared by conventional tabletting techniques to contain the following ingredients:

| Ingredients: | Weight (mg.) |
| --- | --- |
| 1 - [2',4' - dimethoxy - 6' - ω - hydroxyhexyl-1'-phenyl]-1-octen-3-ol | 25 |
| Tragacanth | 10 |
| Lactose | 222.5 |
| Corn starch | 25 |
| Magnesium stearate | 2.5 |

The compounds of the Formula I may be administered as bronchodilators by inhalation therapy in a conventional manner, e.g. by the use of nebulizers, vaporizers, aerosols and the like. Compositions for use in administration by inhalation therapy may be prepared accordingly to conventional procedures and contain the usual conventional ingredients employed in such compositions. A representative aerosol formulation prepared by conventional techniques for use with a metered value system contains the following ingredients:

| Ingredient: | Weight (mg.) |
| --- | --- |
| 1 - [2',4' - dimethoxy - 6' - ω - carboxypentyl - 1' - phenyl] - 1 - octen - 3 - one sodium salt | 0.4—20%. |
| Ethyl alcohol | 10—40%. |
| Ascorbic acid | 1—10%. |
| Freon 11 | 10—30%. |
| Freon 114 | 10—30%. |
| Freon 12 | 30—60%. |
| Buffer system—pH control q.s. | |
| Flavor q.s. | |

The following examples show representative compounds encompassed within the scope of this invention and the manner in which such compounds are prepared. However, it is to be understood that the examples are for purposes of illustration only.

EXAMPLE 1

1-[2',4'-Dimethoxy-6'-ω-Hydroxyhexyl-1'-Phenyl]-1-Octen-3-One

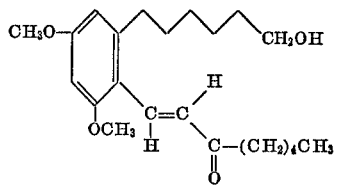

Step A: Preparation of 4-hydroxymethyl-5-ω-hydroxyhexyl-1,3-dimethoxy benzene

To a refluxing stirred mixture of 16.5 g. of lithium aluminum hydride in 200 ml. of dry tetrahydrofuran, there is dropwise added a solution of 43 g. of 6-ω-carboxypentyl-2,4-dimethoxybenzoic acid. After 3 hours the mixture is cooled in ice-water and dropwise treated with 47 ml. of 2 N aqueous NaOH. The solids are filtered and thoroughly washed with chloroform. The combined organic layers are dried over sodium sulfate and evaporated to an oil. The title product is then obtained by distilling the oil (pressure: 0.01 mm., bath temperature 230–260° and triturating the viscous distillate with diethyl ether to crystallize 4 - hydroxymethyl - 5 - ω - hydroxyhexyl - 1,3 - dimethoxy benzene, M.P. 75–78° C.

Step B: Preparation of 6-ω-hydroxyhexyl-2,4-dimethoxybenzaldehyde

A solution of 1.34 g. of the product of Step A dissolved in 5 ml. of dioxane is mixed with a solution of 1.36 g. of dichloro-dicyano-quinone in 5 ml. of dioxane. After 3 hours at room temperature, the mixture is filtered through Celite and evaporated to dryness. The residue is purified by chromatography using silica gel and methanol/chloroform (4:96) and crystallization from diethyl ether to obtain 6-ω-hydroxyhexyl - 2,4 - dimethoxybenzaldehyde, M.P. 80–82.5° C.

Step C: Preparation of 1-[2',4'-dimethoxy-6'-ω-hydroxyhexyl-1'-phenyl]-1-octen-3-one Part A: Protection step.—A solution of 650 mg. of product of Step B in 1.1 ml. of dry pyridine is cooled to 0° C. and treated with 0.35 ml. of trimethyl chlorosilane. After 20 minutes at 0° C., the mixture is evaporated to dryness, the residue is taken up in toluene and the toluene solution is washed 4 times with ice cold saturated aqueous cupric sulfate solution, then 4 times with ice cold brine. After drying over sodium sulfate, the solution is evaporated to dryness to obtain an oil of O-trimethylsilylated starting material.

Part B: Olefin-formation and deprotection.—Sodium hydride prepared by washing 99.8 mg. of a commercially obtained 57% suspension of sodium hydride with petroleum ether is suspended in 4.8 ml. of dry dimethoxyethane and to this mixture is added 0.535 g. of dimethyl-2-oxoheptyl phosphorane. The resulting mixture is stirred under ambient conditions until hydrogen evolution has ceased and there is then added thereto a solution of the O-trimethylsilylated material obtained in Part A in 1.0 ml. of dimethoxyethane. The resulting mixture is heated under reflux for 18 hours, cooled, and treated by addition of 2 ml. of 25% sulfuric acid to remove the protecting group. After holding for 30 minutes ice-water is added followed by extraction with diethyl ether and then short path distillation (200° C./0.01 mm.) to obtain a waxy solid of 1-[2',4' - dimethoxy - 6' - ω - hydroxyhexyl - 1' - phenyl]-1-octen-3-one, m/e=M+362, $R_f$ (silica Gel G chloroform:methanol(95:5))=0.31 and $\lambda\lambda_{Max.}^{CHCl_3}$ 3168 1595 cm.$^{-1}$

EXAMPLE 2

1-[2',4'-dimethoxy-6'-ω-carboxypentyl-1'-phenyl]-1-octen-3-one and sodium salt

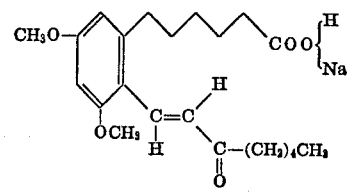

and

1[2',4'-dimethoxy-6'-ω-oxohexyl-1'-phenyl]-1-octen-3-one

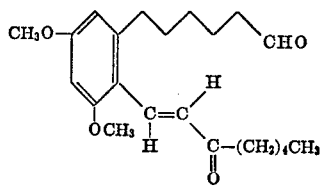

Step A: To a solution of 348 mg. of the final product of Example 1 in 35 ml. of acetone is added 0.42 ml. of a mixture of chromic acid/sulfuric acid (Jones Reagent). After one hour at room temperature 10 ml. of isopropyl alcohol is added followed by the addition of 0.8 g. of sdium bicarbonate. The inorganic solids are filtered off and 30 ml. of water added to the filtrate followed by concentration in vacuo to a volume of about 30 ml. This residue is extracted with diethyl ether and the aqueous layer acidified with 1 N aqueous hydrochloric acid solotion to about pH 2 followed by extraction with ethyl acetate. The ethyl acetate extract is washed with water, dried and evaporated in vacuo to obtain a viscous oil which crystallized on standing to yield 1-[2(,4'-dimethoxy-6'-ω-carboxylpentyl-1'-phenyl]-1-octen-3-one, M.P. 28° C. Prior to crystallization the obtained viscous oil has the following: m/e+M+376, $R_f$ (silica Gel G chloroform: methanol (90:10))=0.25.

$\lambda\lambda_{Max.}^{CHCl_3}$ (OH) 3510

3670 cm.$^{-1}$; (COOH)1705 cm.$^{-1}$.

Step B: The diethyl ether extract obtained above is washed with water, dried and evaporated in vacuo to obtain an oil of 1-[2',4'-dimethoxy-6'-ω-oxohexyl-1'-phenyl]-1-octen-3-one.

Step C: The product of Step A is dissolved in a theoretical volume of 1 N sodium hydroxide solution and evaporated in vacuo to dryness to obtain 1-[2',4'-dimethoxy-6'-ω-carboxypentyl-1'-phenyl]-1-octen-3-one sodium salt.

EXAMPLE 3

1-[2',4'-dimethoxy-6'-ω-carboxypentyl-1'-phenyl]-1-octen-3-ol and sodium salt

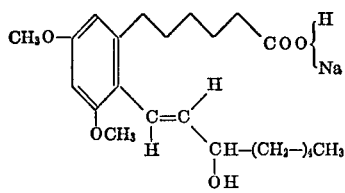

To a solution of 500 mg. of 1-[2',4'-dimethoxy-6'-ω-carboxypentyl-1'-phenyl]-1-octen-3-one in 20 ml. of ice-cold 2 N aqueous sodium hydroxide solution is added 100 mg. of powdered sodium borohydride. The resulting mixture is stirred over 90 minutes at ice-bath temperature and then the temperature raised to 25° C. and the mixture left to stand for 18 hours. There is then added 25 ml. of 2 N hydrochloric acid solution followed by extraction of the free acid with diethyl ether. The ether extract is shaken with 18 ml. of 2 N aqueous sodium hydroxide solution, the aqueous later separated and dissolved ether freed from the aqueous extract by evaporation in vacuo. The residue is freeze-dried to obtain amorphous solids of 1-[2',4'-dimethoxy-6'-ω-carboxypentyl - 1' - phenyl]-1-octen-3-ol sodium salt.

The above obtained sodium salt in the amount of 401 mg. is dissolved in 10 ml. water and acidified with 1.01 ml. of 1 N hydrochloric acid. The resulting mixture is stirred at room temperature for 10 minutes and then extracted 5 times each with 5 ml. of ethyl acetate. The extracts are combined, dried and evaporated in vacuo to obtain an oil of 1-[2',4'-dimethoxy-6'-ω-carboxypentyl-1'-phenyl]-1-octen-3-ol, m/e=M+ 378, $R_f$ (silica Gel G chloroform:methanol (90:10))=0.20, $\lambda_{Max.}^{EtOH}$=261 mμ (E 8,500) and $\lambda\lambda_{Max.}^{CHCl_3}$ (OH) 3500, 3600 cm.$^{-1}$ (COOH) 1710 cm.$^{-1}$

EXAMPLE 4

1-[2',4'-dimethoxy-6'-ω-oxohexyl-1'-phenyl]-1-octen-3-one

To a solution of 300 mg. of the final product of Example 1 in 25 ml. benzene is added 3.0 g. of silver carbonate/Celite reagent and the resulting mixture is stirred at 80° C. until thin layer chromatography of a small sample indicates that the reaction has gone to completion. After filtering off the Celite, the benzene solution is dried and evaporated to an oil which is subjected to distillation (180°/0.005 mm.) to obtain an oil of 1-[2',4'-dimethoxy-6-ω-oxohexyl-1'-phenyl]-1-octen-3-one.

EXAMPLE 5

1-[2',4'-dimethoxy-6'-ω-carboxypentyl-1'-phenyl]-1-octen-3-one

A mixture of a solution of 210 mg. of the final product of Example 4 in 20 ml. of ethanol and 500 mg. of silver oxide is vigorously shaken for 18 hours at room temperature. The resulting mixture is centrifuged and the resulting solution evaporated in vacuo to an oil of 1-[2'-4'-dimethoxy-6'-ω-carboxypentyl-1'-phenyl]-1-octen-3-one.

EXAMPLE 6

1-[2',4'-dimethoxy-6'-ω-carboxypentyl-1'-phenyl]-1-octen-3-one isopropyl ester

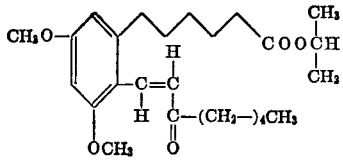

To a solution of 300 mg. of the final product of Example 5 in 5 ml. of isopropyl alcohol at 0° C. is added 0.2 ml. of concentrated sulfuric acid and the resulting mixture is kept at 0° C. for 18 hours. The mixture is then poured in a mixture of 1.0 g. of sodium bicarbonate and 20 g. of ice followed by extraction with diethyl ether. The ether extract is washed with water, dried and evaporated in vacuo to obtain an oil of 1-[2',4'-dimethoxy-6'-ω-carboxypentyl-1'-pentyl]-1-octen-3-one isopropyl ester.

EXAMPLE 7

1-[2',4'-dihydroxy-6'-ω-hydroxyhexyl-1'-phenyl]-1-octen-3-one

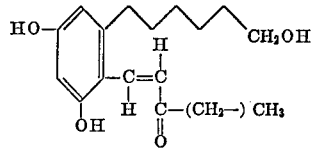

Step A: Preparation of 6-ω-hydroxyhexyl-2,4-dihydroxybenzaldehyde.—To a solution of 100 mg. of 6-ω-hydroxyhexyl-2,4-dimethoxybenzaldehyde in 1 ml. of methylene chloride at 0° C. is added 0.4 ml. of boron tribromide in 1 ml. of methylene chloride. After 30 seconds the mixture is evaporated in vacuo at a final bath temperature of 30° C. The resulting solid residue is triturated with water and the solids obtained washed with water and dried to obtain 6-ω-hydroxyhexyl-2,4-dihydroxybenzaldehyde.

Step B: Preparation of 1-[2',4'-dihydroxy-6'-ω-hydroxyhexyl-1'-phenyl]-1-octen-3-one.—The product of Step A immediately above is reacted according to the two part procedure of Step C of Example 1 except that 3 times the equivalent amount of trimethyl chlorosilane is employed and the pyridine reaction mixture is permitted to stand for 18 hours at room temperature whereby there is obtained 1-[2',4'-dihydroxy-6'-ω-hydroxyhexyl-1'-phenyl]-1-octen-3-one.

EXAMPLE 8

1-[2',4'-diacetoxy-6'-ω-acetoxyhexyl-1'-phenyl]-1-octen-3-one

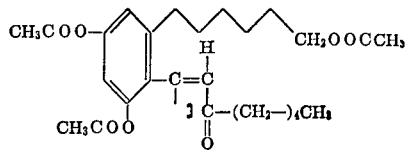

The product of Step A of Example 7 is reacted according to the two part procedure of Step C of Example 1 except that in olefin-formation and deprotection Part B the deprotection is effected by the addition of 2 ml. of acetic anhydride and 2 ml. of pyridine (in place of the sulfuric acid) followed by holding at room temperature for 18 hours whereby there is obtained 1-[2',4'-diacetoxy-6'-ω-acetoxyhexyl-1'-phenyl]-1-octen-3-one.

EXAMPLE 9

6-ω-hydroxyhexyl-2,4-dipropoxybenzaldehyde

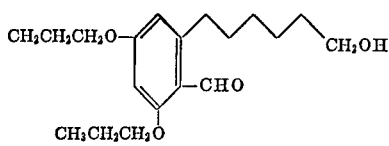

A solution of 300 mg. of 6-ω-hydroxyhexyl-2,4-dihydroxy-benzaldehyde in 5 ml. of ethanol is heated at reflux while treating alternately with small portions of a 1 N ethanolic potassium hydroxide solution and isopropyl iodide until thin layer chromatography indicates that the reaction is completed. Whereupon the reaction mixture is treated with water, extracted with diethyl ether and the exraction washed, dried and evaporated in vacuo to obtain an oil of 6-ω-hydroxyhexyl-2,4-dipropoxybenzaldehyde.

EXAMPLE 9A

Following the procedure of Example 9 and employing the appropriate corresponding starting materials and approximately similar proportions, there are also prepared:

(a) 6-ω-hydroxyhexyl-2,4-diethoxybenzaldehyde.
(b) 6-ω-hydroxyhexyl-2,4-dicyclopentylbenzaldehyde.

EXAMPLE 9B

Following the procedure of Step C of Example 1 and employing the appropriate corresponding starting materials and approximately similar proportions there are prepared:

(a) 1-[2′,4′-dipropoxy-6′-ω-hydroxyhexyl-1′-phenyl]-1-octen-3-one.
(b) 1-[2′,4′-diethoxy-6′-ω-hydroxyhexyl-1′-phenyl]-1-octen-3-one.
(c) 1-[2′,4′-dicyclopentyl-6′-ω-hydroxyhexyl-1′-phenyl]-1-octen-3-one.

EXAMPLE 10

1-[2′,4′-dimethoxy-6′-ω-carboxypentyl-1′-phenyl]-1-octen-3-ol isopropyl ester

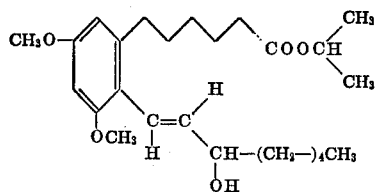

To a solution of 600 mg. of the final product of Example 6 in 15 ml. of isopropyl alcohol, there is added, at 0° C., 100 mg. of lithium borohydride and the mixture is stirred at 0° C. until thin layer chromatography of a small sample removed from the reaction mixture indicates that the reaction is complete. Carbon dioxide is then introduced, the mixture partially concentrated, filtered, then further concentrated to a viscous oil that is taken up in 20 ml. of methylene chloride. This solution is poured through a column made up from 5 g. of "Florisil" (magnesium-silicate absorbent); and the column is washed further with methylene chloride. Evaporation of the methylene chloride fractions selected on the basis of analytical thin layer chromatography, yields an oil of 1-[2′,4′-dimethoxy-6′-ω-carboxypentyl-1′-phenyl]-1-octen-3-ol isopropyl ester, $R_f$ (silica Gel G chloroform:methanol (95:5))=0.55 and m/e=M$^+$420.

EXAMPLE 11

1-[2′,4′-dimethoxy-6′-ω-hydroxyhexyl-1′-phenyl]-1-octen-3-ol

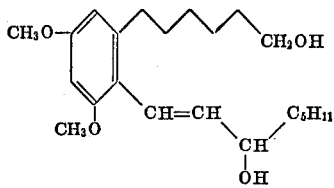

To a solution of 6.0 g. of 1-[2′,4′-dimethoxy-6′-ω-hydroxy-hexyl-1′-phenyl]-1-octen-3-one, in a mixture of 90 ml. methylene chloride and 90 ml. of methanol, there is portionwise added, at 0-5° C., 1.89 g. of sodium borohydride. After 2 hours at 5° C., water is added, the methylene chloride solution separated, washed, dried and evaporated to obtain an oil of 1-[2′,4′-dimethoxy-6′-ω-hydroxyhexyl]-1′-phenyl]-1-octen-3-ol; $R_f$ (silica Gel G, chloroform/methanol (90:10))=0.45, $\lambda\lambda_{Max.}^{CHCl_3}$: 3610, 3500–3400 (broad) cm.$^{-1}$, m/e=M$^+$ 364, $\lambda_{Max.}^{EtOH}$=261 mμ (E 13,050)

EXAMPLE 12

6-ω-hydroxyhexyl-2,4-dihydroxybenzaldehyde, an intermediate of the Formula II hereof in which R$_2$ is hydrogen and having the formula:

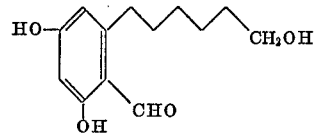

Step A: Preparation of 4-hydroxymethyl-5-ω-hydroxyhexyl-1,3-dibenzyloxybenzene

To a refluxing stirred solution of 45.6 g. of lithium aluminum hydride in 1500 ml. of anhydrous tetrahydrofuran, there is dropwise added a solution of 176 g. of crude 6-ω-carboxypentyl-2,4-dibenzyloxybenzoic acid. After 18 hours, the mixture is cooled in an ice-bath and dropwise treated with 200 ml. of saturated cuprous ammonium chloride solution and 400 g. of solid sodium sulfate. After filtration, the tetrahydrofuran solvent is stripped off in vacuo, the residue taken up in benzene, and washed with 2 N sodium hydroxide solution, and subsequently with water. After drying, the benzene solution is evaporated to an oil which is then subjected to chromatography on silica gel (elution with benzene chloroform 1:1), followed by crystallization from ether to obtain 4-hydroxymethyl-5-ω-hydroxyhexyl-1,3-dibenzyloxybenzene, M.P. 68–71°.

Step B: Preparation of 6-ω-hydroxyhexyl-2,4-dibenzyloxybenzaldehyde

A solution of 1.67 g. of 4-hydroxymethyl-5ω-hydroxyhexyl-1,3-dibenzyloxybenzene and 1.09 g. of dichlorodicyanoquinone in 11 ml. of dioxane is kept at 25–30° C. for 2 hours, then passed through a small column of 15 g. of basic alumina (grade II). The eluate is evaporated to dryness and the residual oil distilled (230°/0.001 mm.) to yield 6-ω-hydroxyhexyl-2,4-dibenzyloxybenzaldehyde as a colorless oil; $R_f$=0.40 (CHCl$_3$CH$_3$OH=95.5, silica gel G);

$\lambda\lambda_{max.}^{CHCl_3}$: 3605, 1670, 1595, 1570, and 1150 cm.$^{-1}$

Step C: Preparation of 6-ω-hydroxybenzyl-2,4-dihydroxybenzaldehyde

A solution of 650 g. of the product of Step B in 12 ml. of glacial acetic acid containing 25% anhydrous hydrogen bromide is heated, in a closed vessel at 75° C. for 2 hours. After cooling, the solution is evaporated to dryness in vacuo and the residue is dissolved in 12 ml. of glacial acetic acid containing 500 mg. of silver acetate. After 2 hours at room temperature, the inorganic solids are filtered off and the filtrate concentrated in vacuo. Ethanol (15 ml.) containing 0.5 ml. of 40% aqueous potassium hydroxide is then added and the solution thus obtained heated at 80° C. for 30 minutes under a nitrogen atmosphere. After cooling, water (25 ml.) is added followed by extraction with m-butanol. The washed and dried butanol layers are evaporated to obtain a resinous solid of 6-ω-hydroxybenzyl-2,4-dihydroxybenzaldehyde.

What is claimed is:

1. A compound of the formula:

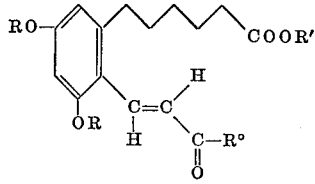

wherein

R° is straight chain alkyl of 4 to 6 carbon atoms;
R' is hydrogen, a pharmaceutically acceptable salt-forming cation or alkyl of 1 to 4 carbon atoms; and
both R's which are the same, are hydrogen or alkyl of 1 to 3 carbon atoms.

2. A compound of claim 1 in which R' is hydrogen.
3. The compound of claim 2 in which R is methyl and R° is pentyl.
4. A compound of claim 1 in which R' is a salt-forming cation.
5. A compound of claim 4 in which R is methyl and R° is pentyl.
6. The compound of claim 5 in which the cation is the cation of sodium.
7. A compound of claim 1 in which R' is lower alkyl.
8. A compound of claim 7 in which R is methyl and R° is pentyl.
9. The compound of claim 8 in which R' is isopropyl.

References Cited
UNITED STATES PATENTS 3,644,502   2/1972   Morin et al. _____ 280—514 R

OTHER REFERENCES

Crossley: "Tetrahedron Letters" 36, 3327 (1971).
Collet: Chem. Abst. 73, 76804t (1970).

LORRAINE A. WEINBERGER, Primary Examiner

J. F. TERAPANE, Assistant Examiner

U.S. Cl. X.R.

260—448.8 A, 473 S, 479 R, 520, 521 R, 590, 600, 613 R, 613 D, 621 K; 424—308, 311, 317, 331, 333, 341, 346